US006948132B2

(12) United States Patent
Bennett et al.

(10) Patent No.: US 6,948,132 B2
(45) Date of Patent: Sep. 20, 2005

(54) METHOD FOR MAPPING SCREEN DISPLAY OBJECTS WITH SPATIAL COORDINATES INTO AN HTML TABLE

(75) Inventors: Craig Alan Bennett, Woodstock, GA (US); Timothy Daniel Crowley, Acworth, GA (US)

(73) Assignee: International Business Machines Corporation, Armonk, NY (US)

( * ) Notice: Subject to any disclaimer, the term of this patent is extended or adjusted under 35 U.S.C. 154(b) by 532 days.

(21) Appl. No.: 10/015,109

(22) Filed: Dec. 12, 2001

(65) Prior Publication Data

US 2003/0107594 A1 Jun. 12, 2003

(51) Int. Cl.[7] .............................. G06F 3/14; G06F 7/00
(52) U.S. Cl. ....................... 715/760; 715/764; 715/513; 715/509; 345/619; 345/634
(58) Field of Search ................................ 715/760, 764, 715/792, 788, 762, 781, 806, 513, 509, 517, 520, 526, 815; 345/619, 629, 630, 634, 635

(56) References Cited

U.S. PATENT DOCUMENTS

| | | | | |
|---|---|---|---|---|
| 5,893,127 A | * | 4/1999 | Tyan et al. ................. | 715/513 |
| 5,911,145 A | * | 6/1999 | Arora et al. ................ | 715/514 |
| 5,948,066 A | | 9/1999 | Whalen et al. ............. | 709/229 |
| 6,088,708 A | * | 7/2000 | Burch et al. ................ | 715/509 |
| 6,128,655 A | | 10/2000 | Fields et al. ................ | 709/219 |
| 6,167,441 A | | 12/2000 | Himmel ...................... | 709/217 |
| 6,173,316 B1 | | 1/2001 | De Boor et al. ............ | 709/218 |
| 6,185,589 B1 | * | 2/2001 | Votipka ....................... | 715/517 |
| 6,212,564 B1 | | 4/2001 | Harter et al. ............... | 709/228 |
| 6,289,382 B1 | | 9/2001 | Bowman-Amuah ......... | 709/226 |
| 6,639,611 B1 | * | 10/2003 | Leduc ......................... | 715/764 |
| 6,757,870 B1 | * | 6/2004 | Stinger ........................ | 715/513 |
| 2002/0178183 A1 | * | 11/2002 | Meding ....................... | 707/509 |

FOREIGN PATENT DOCUMENTS

| | | | |
|---|---|---|---|
| GB | 2329310 | 3/1999 | ......... H04N/7/173 |
| JP | 9200172643 | 6/2001 | ........... G06F/15/00 |
| WO | WO9957649 | 11/1999 | ........... G06F/17/00 |

OTHER PUBLICATIONS

Research Disclosure "Migration of 3270 User Interface Transactions to Web User Interface Transactions", No. 435149 p. 1285, Jul. 2000.
Research Disclosure "Network Bandwidth Reduction on the WWW (World Wide Web) Using Intelligent Server that Utilize the Device capabilities of the Client", No. 433143 p. 948, May 2000.
Research Disclosure "A Process for the Blending of Web Content", No. 432174 p. 778, Apr. 2000.
Research Disclosure Migration of 3270 User Interface Transactions to Web User Interface Transactions, No. 430189, p. 400, Feb. 2000.

* cited by examiner

Primary Examiner—Raymond J. Bayerl
(74) Attorney, Agent, or Firm—Schmeiser, Olsen & Watts; John Pivnichny

(57) ABSTRACT

A method of mapping screen display objects located by spatial coordinates into a Hypertext Markup Language (HTML) table. The spatial coordinates for each screen display object are determined, and an HTML table having rows and columns is created, wherein row heights and column widths are determined by the spatial coordinates. The screen display objects are then loaded into cells of the HTML table for display, as determined by computation based on the spatial coordinates.

8 Claims, 4 Drawing Sheets

METHOD FOR MAPPING SCREEN DISPLAY OBJECTS WITH SPATIAL COORDINATES INTO AN HTML TABLE

FIELD OF THE INVENTION

The present invention concerns the field of information display, and more particularly a method for mapping screen display objects having spatial coordinates into an HTML table, so that the objects may be displayed conveniently by a wide range of applications such as web browsers.

BACKGROUND

As the Internet and World Wide Web become ever more widely accepted, designers who organize information for visual display increasingly approach the layout of screen display objects with certain predispositions favorable to standard Internet technology. In particular, a standard approach for specifying the locations of screen display objects on a display screen has evolved—each screen display object is enclosed by a rectangle, and the location of the screen display object is specified by spatial coordinates of the rectangle relative to the display screen.

The task of translating fixed position content with spatial coordinates to DHTML layered content is straightforward when a designer uses an advanced web-based language such as Dynamic HyperText Markup Language (DHTML). Unfortunately, this kind of translation has several disadvantages and limitations. One limitation is that DHTML is not universally accessible to all kinds of display terminals. For example, wireless devices such as hand-held communication terminals generally cannot read DHTML. Moreover, accessibility may be hampered by the complex DHTML layering. Also, consistency is lacking, as a DHTML browser may operate differently on two different platforms, and DHTML content may differ significantly between versions of a browser.

Thus there is a need for transforming the spatial coordinates of fixed-position screen display objects into a form that wireless devices can access without heroic manipulations, a form that provides consistency so a wide range of web browsers may be successfully used, and a form that provides universality so that different DHTML code need not be written for each browser version.

SUMMARY

The present invention provides a method of mapping screen display objects into a Hypertext Markup Language (HTML) table. Spatial coordinates for each screen display object are determined, and an HTML table having rows and columns is created, wherein row heights and column widths are determined by the spatial coordinates. The screen display objects are then loaded into selected cells of the HTML table for display, wherein selection of the cells is determined as a function of the spatial coordinates.

In addition to solving the aforementioned problems of accessibility, consistency, and universality, the present invention also provides a method for converting pre-existing content into flat HTML, and enables accessibility tools such as screen readers to read the resulting page content with less operational complexity. These and other aspects of the invention will be appreciated more fully when considered in the light of the following detailed description and drawings.

DETAILED DESCRIPTION

The present invention provides a method for mapping screen display objects with spatial coordinates to an HTML table, so that the screen display objects may be processed and displayed conveniently, consistently, and universally by a wide variety of applications such as web browsers.

Figure 1:
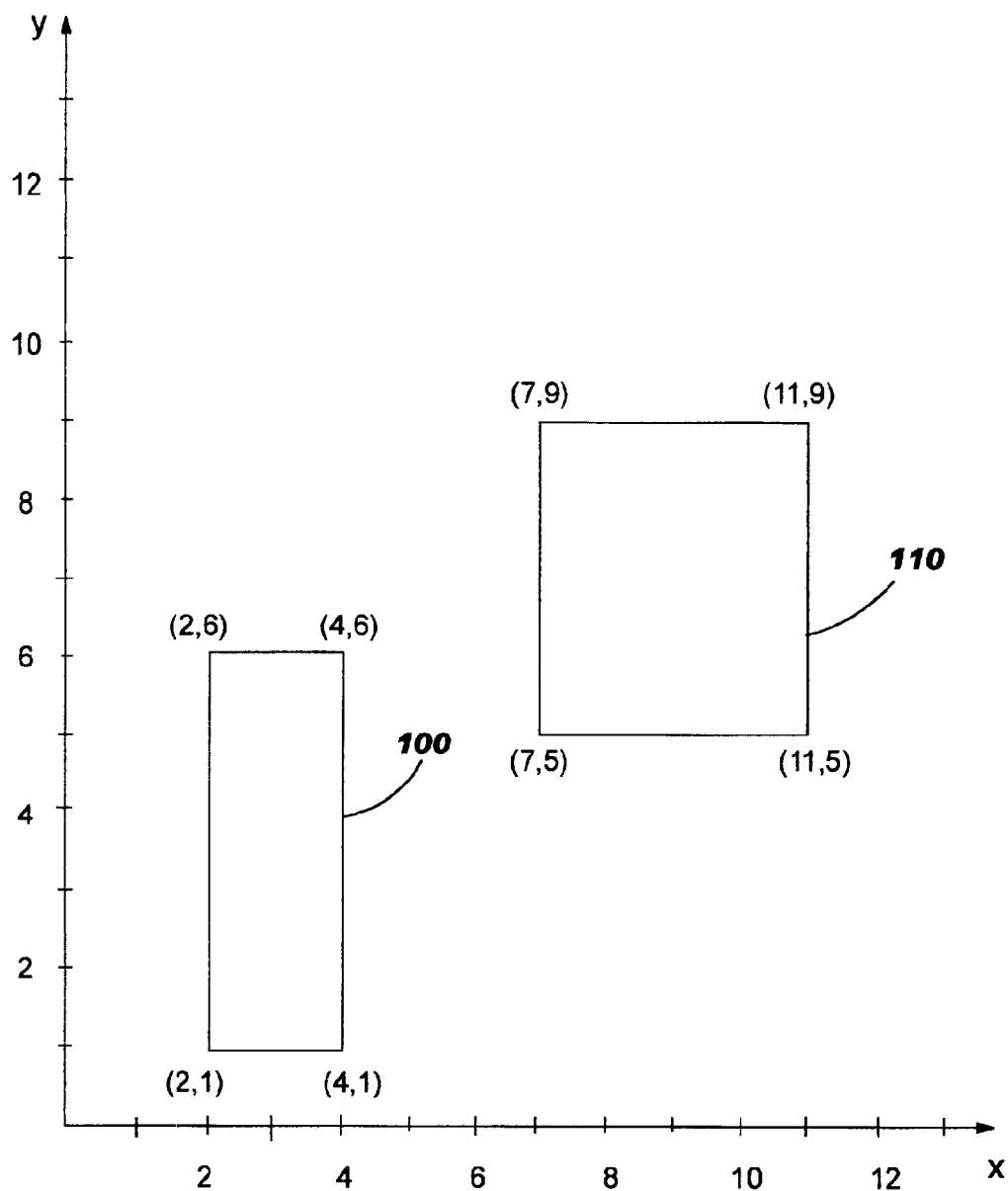
FIG. 1 is a diagram that shows two exemplary screen display objects and associated spatial coordinates.

A screen display object may be contained within an area of a display screen specified by spatial coordinates. For example, a screen display object may be contained within a rectangular area of the screen, where the four corners of the rectangle are specified by Cartesian coordinates. Such coordinates may also be called rectangular coordinates or x-y coordinates, and may be conveyed by ordered pairs with respect to a reference called the origin. For purposes of clear explanation, a running example of this kind is discussed below, although the present invention is, of course, not limited by the running example. As shown in FIG. 1, the example considers two exemplary screen display objects, a first screen display object 100 having spatial coordinates (2,1), (4,1), (4,6) and (2,6), and a second screen display object 110 having spatial coordinates (7,5), (11,5), (11,9) and (7,9), all with respect to an origin that has spatial coordinates (0,0).

Figure 2:
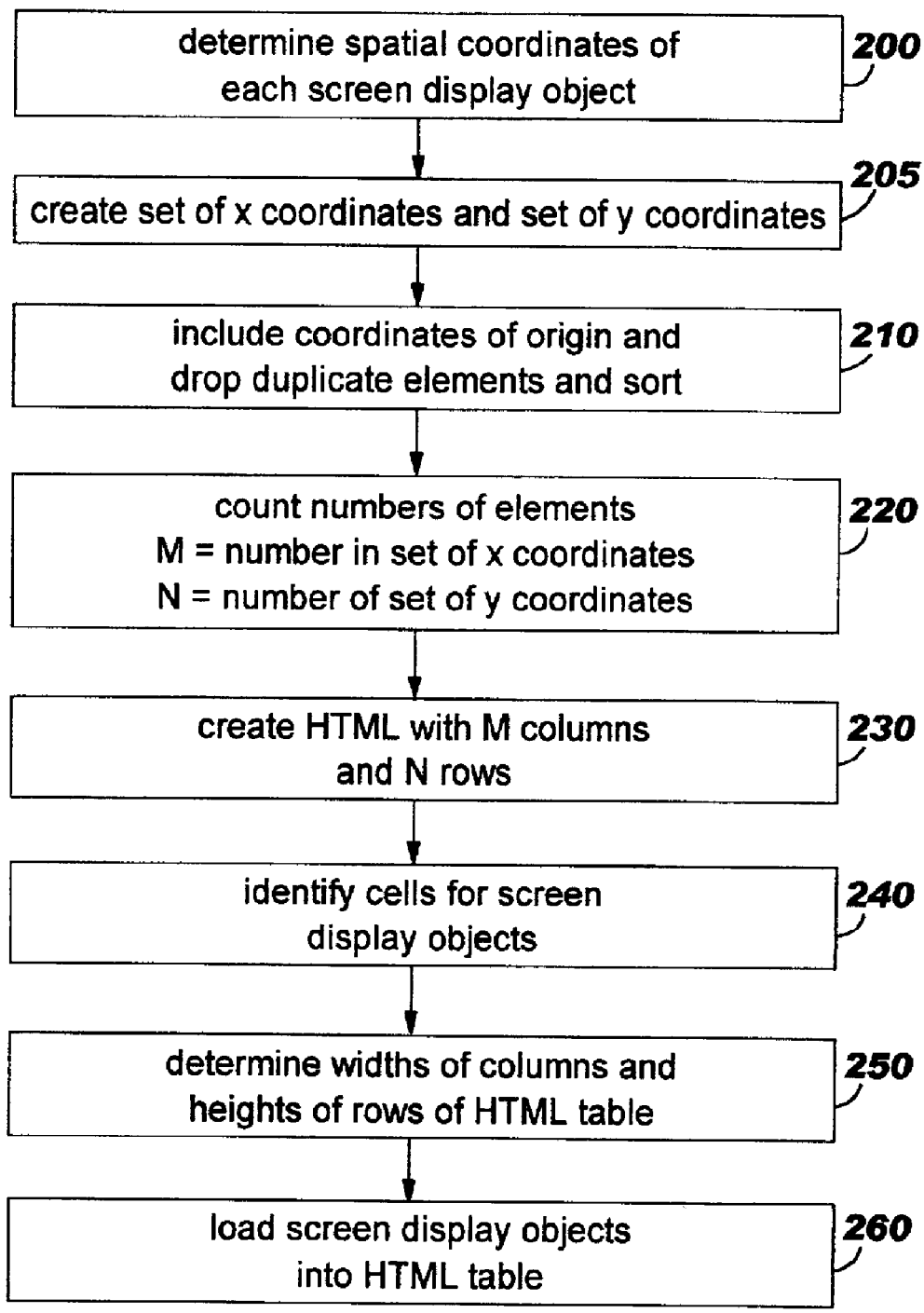
FIG. 2 is a flow chart that illustrates conversion of fixed-position content with spatial coordinates into an HTML table.

FIG. 2 is a flow chart that shows the operation of an exemplary embodiment of a method according to the invention. As shown in FIG. 2, the spatial coordinates of the screen display objects are determined, to provide a first x coordinate, a second x coordinate, a first y coordinate, and a second y coordinate for each screen display object (step 200). Coordinates are ordered so that the numerical value of the first x coordinate is less than the numerical value of the second x coordinate, and the numerical value of the first y coordinate is less than the numerical value of the second y coordinate.

For example, the location of a rectangle may be described by the four ordered pairs (a,c), (b,c), (b,d), and (a,d). For this rectangle, the first x coordinate would be a, the second x coordinate would be b, the first y coordinate would be c, and the second y coordinate would be d. In particular, for the first screen display object 100 in the running example, the first and second x coordinates are 2 and 4, respectively, and the first and second y coordinates are 1 and 6, respectively. For the second screen display object 110 in the running example, the first and second x coordinates are 7 and 11, respectively, and the first and second y coordinates are 5 and 9, respectively.

A set of x coordinates and a set of y coordinates are created (step 205). The set of x coordinates includes the first and second x coordinates of each screen display object; likewise, the set of y coordinates includes the first and second y coordinates of each screen display object. Also, the x coordinate of the origin and the y coordinate of the origin are included in the set of x coordinates and the set of y coordinates, respectively (step 210). Duplicates of any element in the set of x coordinates are dropped, and duplicates of any element in the set of y coordinates are dropped. The remaining elements of each set are then sorted into numerical order. In the running example, the resulting set of x coordinates would be (0, 2, 4, 7, 11) and the set of y coordinates would be (0, 1, 5, 6, 9).

A count is then made of the numbers of elements remaining in the sets after duplicate elements are dropped (step 220). The number of elements in the set of x coordinates and the number of elements in set of y coordinates are denoted here by the variables M and N, respectively. In the running example, both M and N have the value 5.

An HTML table with M columns and N rows is then created (step 230). In the running example, the table would have five columns and five rows.

For each screen display object, a cell of the HTML table is identified (step 240). A cell includes the intersection of at least one column and at least one row of the table. When a cell includes more than one column, the included columns are contiguous in the table; likewise, when a cell includes more than one row, the included rows are contiguous in the table. For example, a cell might be the intersection of the second column with the third row of the table, or the intersection of the second column with the third and fourth rows of the table, or the intersection of the first and second columns with the fourth and fifth rows of the table, and so forth, but not the intersection of the first and third columns with the second row.

Figure 3:
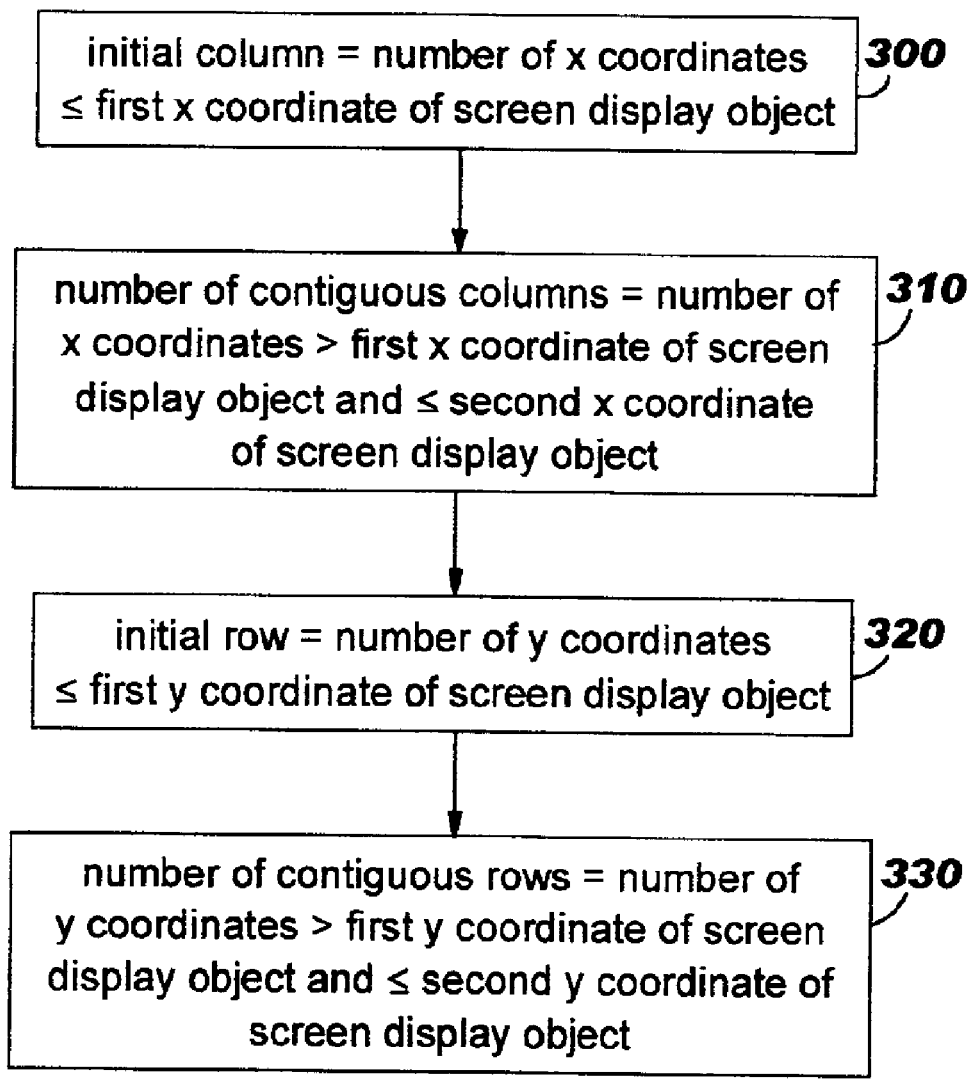
FIG. 3 is a flow chart that illustrates a way of determining a cell in the HTML table of FIG. 2 appropriate for holding a screen display object.

One way to identify the cells, which is shown in FIG. 3, is as follows: For a given screen display object, count the number of elements in the set of x coordinates that are less than or equal to the first x coordinate of the screen display object (step 300). The result identifies the initial column of an intersection that determines the cell. Count the number of elements in the set of x coordinates that are greater than the first x coordinate of the screen display object and less than or equal to the second x coordinate of the screen display object (step 310). The result indicates the number of contiguous columns, including the initial column, in the intersection. Count the number of elements in the set of y coordinates that are less than or equal to the first y coordinate of the screen display object (step 320). The result identifies the initial row of the intersection. Count the number of elements in the set of y coordinates that are greater than the first y coordinate of the screen display object and less than or equal to the second y coordinate of the screen display object (step 330). The result indicates the number of contiguous rows, including the initial row, in the intersection. The cell for the given screen display object is the intersection just described.

For the first exemplary screen display object 100, the first x coordinate is 2 and the second x coordinate is 4. The set of x coordinates, (0, 2, 4, 7, 11), includes two elements less than or equal to 2; thus, the initial column of the intersection is column 2. The set of x coordinates includes one element greater than 2 and less than or equal to 4; thus, the intersection includes just one column, which is the initial column, i.e., column 2. The first y coordinate is 1 and the second y coordinate is 6. The set of y coordinates, (0, 1, 5, 6, 9), includes two elements less than or equal to 1; thus, the initial row of the intersection is row 2. The set of y coordinates includes two elements greater than 1 and less than or equal to 6; thus, the intersection includes two rows, row 2 (i.e., the initial row) and row 3. Consequently, the cell for the first exemplary screen display object 100 is the intersection of column 2 with rows 2 and 3.

For the second exemplary screen display object 110, the first x coordinate is 7 and the second x coordinate is 11. The set of x coordinates, (0, 2, 4, 7, 11), includes four elements less than or equal to 7; thus, the initial column of the intersection is column 4. The set of x coordinates includes one element greater than 7 and less than or equal to 11; thus, the intersection includes just one column, which is column 4. The first y coordinate is 5 and the second y coordinate is 9. The set of y coordinates, (0, 1, 5, 6, 9), includes three elements less than or equal to 5; thus, the initial row of the intersection is row 3. The set of y coordinates includes two elements greater than 5 and less than or equal to 9; thus, the intersection includes two rows, row 3 (i.e., the initial row) and row 4. Consequently, the cell for the second exemplary screen display object 110 is the intersection of column 4 with rows 3 and 4.

Based on the set of x coordinates, the width of each column of the HTML table is determined, and, based on the set of y coordinates, the height of each row is determined (step 250 of FIG. 2). Each screen display object is then loaded into its appropriate cell (step 260).

One way to determine the widths of the columns of the table and the heights of the rows is to set the widths equal to the differences between consecutive elements in the set of x coordinates, and to set the heights equal to the differences between consecutive elements in the set of y coordinates. Thus, the width of the first column of the HTML table may be the difference found by subtracting the first element of the set of x coordinates from the second element; the width of the second column may be found by subtracting the second element of the set of x coordinates from the third element, and so forth, and likewise in kind for the heights of the rows, based on differences between consecutive elements in the set of y coordinates. By default, the final column and the final row of the table each have width and length of one, to provide a border.

Figure 4:
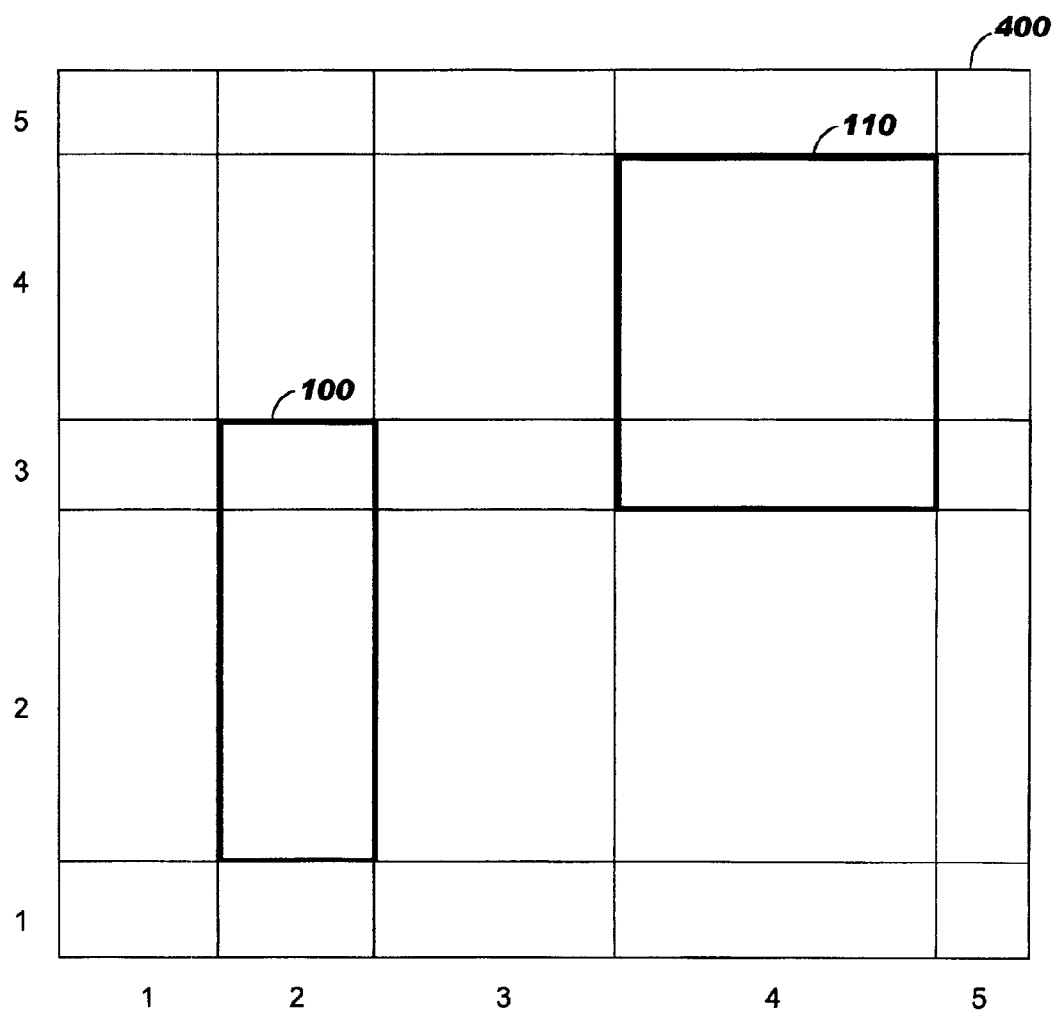
FIG. 4 shows an HTML table holding the two exemplary screen display objects of FIG. 1.

In the running example, the set of x coordinates is (0, 2, 4, 7, 11) and the set of y coordinates is (0, 1, 5, 6, 9). Consequently, the width of the first column would be 2, the width of the second column would be 2, the width of the third column would be 3, the width of the fourth column would be 4, and the width of the fifth column would be 1. Likewise, the height of the first row would be 1, the height of the second row would be 4, the height of the third row would be 1, the height of the fourth row would be 3, and the height of the fifth row would be 1. Such an exemplary table 400 is shown in FIG. 4, with the exemplary screen display objects 100, 110 located in the appropriate cells.

From the foregoing description, those skilled in the art will appreciate that the present invention provides a versatile, consistent, and universal way of mapping fixed-position content screen display objects with spatial coordinates into an HTML table. The foregoing description is illustrative rather than limiting, however, and the present invention is limited only by the claims that follow.

We claim:

1. A method for including screen display objects in a Hypertext Markup Language (HTML) table, said method comprising:

for each screen display object of a plurality of screen display objects, determining two cartesian coordinate pairs that specify a location of the screen display object, each cartesian pair consisting of a x coordinate and a y coordinate relative to a x coordinate and a y coordinate of an origin, respectively;

combining the x coordinate of the origin with all of the x coordinates of the cartesian coordinate pairs of all screen display objects of the plurality of screen display objects to form a set of x coordinates arranged in order of ascending numerical value of x;

combining the y coordinate of the origin with all of the y coordinates of the cartesian coordinate pairs of all screen display objects of the plurality of screen display objects to form a set of y coordinates arranged in order of ascending numerical value of y;

eliminating all duplicate x coordinates in the set of x coordinates, resulting in M being the total number of x coordinates in the set of x coordinates;

eliminating all duplicate y coordinates in the set of y coordinates, resulting in N being the total number of y coordinates in the set of y coordinates;

creating an HTML table having M columns and N rows;

for each screen display object of the plurality of screen display objects, using the set of x coordinates and the set of y coordinates to determine N1 contiguous columns and N1 contiguous rows, followed by identifying a cell of the HTML table as an intersection of the M1 contiguous columns and the N1 contiguous rows;

determining the width of each column of the M columns of the HTML table;

determining the height of each row of the N rows of the HTML table; and loading each screen display object into its cell of the HTML table.

2. The method of claim 1, wherein a first and a second x coordinate of the screen display object is the smallest and largest x coordinate, respectively, in the two cartesian coordinate pairs of the screen display object, wherein a first and a second y coordinate of the screen display object is the smallest and largest y coordinate, respectively, in the two cartesian coordinate pairs of the screen display object, and wherein said using the set of x coordinates and the set of y coordinates to determine the M1 contiguous columns and the N1 contiguous rows for each screen display object comprises:

determining a first column number of the M1 contiguous columns as equal to the number of x coordinates in the set of x coordinates that are less than or equal to the first x coordinate of the screen display object, determining N1 as equal to the number of x coordinates in the set of x coordinates that are greater than the first x coordinate of the screen display object and less than or equal to the second x coordinate of the screen display object, determining a first row number of the N1 contiguous rows as equal to the number of y coordinates in the set of y coordinates that are less than or equal to the first y coordinate of the screen display object, and determining M1 as equal to the number of y coordinates in the set of y coordinates that are greater than the first y coordinate of the screen display object and less than or equal to the second y coordinate of the screen display object.

3. The method of claim 1, wherein said determining the width of each column of the M columns of the HTML table comprises determining the width of column m by subtracting the $m^{th}$ x coordinate from the $(m+1)^{th}$ x coordinate in the set of x coordinates for m=1, 2, . . . , M−1 and setting the width of column M equal to 1, and wherein said determining the height of each row of the N rows of the HTML table comprises determining the height of row n by subtracting the $n^{th}$ y coordinate from the $(n+1)^{th}$ y coordinate in the set of y coordinates for n=1, 2, . . . , N−1 and setting the height of row N equal to 1.

4. The method of claim 1, further comprising using the HTML to display the plurality of screen display objects on a screen display.

5. The method of claim 4, said using the HTML to display the plurality of screen display objects on a screen display being performed by a web browser.

6. A system for including screen display objects in a Hypertext Markup Language (HTML) table, said system comprising:

for each screen display object of a plurality of screen display objects, means for determining two cartesian coordinate pairs that specify a location of the screen display object, each cartesian pair consisting of a x coordinate and a y coordinate relative to a x coordinate and a y coordinate of an origin, respectively;

means for combining the x coordinate of the origin with all of the x coordinates of the cartesian coordinate pairs of all screen display objects of the plurality of screen display objects to form a set of x coordinates arranged in order of ascending numerical value of x;

means for combining the y coordinate of the origin with all of the y coordinates of the cartesian coordinate pairs of all screen display objects of the plurality of screen display objects to form a set of y coordinates arranged in order of ascending numerical value of y;

means for eliminating all duplicate x coordinates in the set of x coordinates, resulting in M being the total number of x coordinates in the set of x coordinates;

means for eliminating all duplicate y coordinates in the set of y coordinates, resulting in N being the total number of y coordinates in the set of y coordinates;

means for creating an HTML table having M columns and N rows;

for each screen display object of the plurality of screen display objects, means for using the set of x coordinates and the set of y coordinates to determine M1 contiguous columns and N1 contiguous rows, followed by identifying a cell of the HTML table as an intersection of the M1 contiguous columns and the N1 contiguous rows;

means for determining the width of each column of the M columns of the HTML table;

means for determining the height of each row of the N rows of the HTML table; and means for loading each screen display object into its cell of the HTML table.

7. The system of claim 6, wherein a first and a second x coordinate of the screen display object is the smallest and largest x coordinate, respectively, in the two cartesian coordinate pairs of the screen display object, wherein a first and a second y coordinate of the screen display object is the smallest and largest y coordinate, respectively, in the two cartesian coordinate pairs of the screen display object, and wherein said means for using the set of x coordinates and the set of y coordinates to determine the M1 contiguous columns and the N1 contiguous rows for each screen display object utilizes:

a determination of a first column number of the M1 contiguous columns as equal to the number of x coordinates in the set of x coordinates that are less than or equal to the first x coordinate of the screen display object, a determination of M1 as equal to the number of x coordinates in the set of x coordinates that are greater than the first x coordinate of the screen display object and less than or equal to the second x coordinate of the screen display object, a determination of a first row number of the N1 contiguous rows as equal to the number of y coordinates in the set of y coordinates that are less than or equal to the first y coordinate of the screen display object, and a determination of N1 as equal to the number of y coordinates in the set of y coordinates that are greater than the first y coordinate of the screen display object and less than or equal to the second y coordinate of the screen display object.

8. The system of claim 6, wherein said means for determining the width of each column of the M columns of the HTML table utilizes a determination of the width of column m by a subtraction of the $m^{th}$ x coordinate from the $(m+1)^{th}$ x coordinate in the set of x coordinates for m=1, 2, ..., M−1 and a setting of the width of column M equal to 1, and wherein said means for determining the height of each row of the N rows of the HTML table utilizes a determination of the height of row n by a subtraction of the $n^{th}$ y coordinate from the $(n+1)^{th}$ y coordinate in the set of y coordinates for n=1, 2, ..., N−1 and a setting of the height of row N equal to 1.

* * * * *